United States Patent
Gateshki et al.

(10) Patent No.: US 12,007,343 B2
(45) Date of Patent: Jun. 11, 2024

(54) X-RAY BEAM SHAPING APPARATUS AND METHOD

(71) Applicant: Malvern Panalytical B.V., Almelo (NL)

(72) Inventors: Milen Gateshki, Almelo (NL); Alexander Kharchenko, Almelo (NL); Detlef Beckers, Almelo (NL); Nicholas Norberg, Almelo (NL)

(73) Assignee: Malvern Panalytical B.V., Almelo (NL)

( * ) Notice: Subject to any disclaimer, the term of this patent is extended or adjusted under 35 U.S.C. 154(b) by 126 days.

(21) Appl. No.: 17/600,803

(22) PCT Filed: Apr. 3, 2020

(86) PCT No.: PCT/EP2020/059683
§ 371 (c)(1),
(2) Date: Oct. 1, 2021

(87) PCT Pub. No.: WO2020/201565
PCT Pub. Date: Oct. 8, 2020

(65) Prior Publication Data
US 2022/0163466 A1 May 26, 2022

(30) Foreign Application Priority Data
Apr. 4, 2019 (EP) .................................... 19167406

(51) Int. Cl.
*G01N 23/20008* (2018.01)
*G01N 23/207* (2018.01)

(52) U.S. Cl.
CPC ..... *G01N 23/207* (2013.01); *G01N 23/20008* (2013.01); *G01N 2223/056* (2013.01);
(Continued)

(58) Field of Classification Search
None
See application file for complete search history.

(56) References Cited

U.S. PATENT DOCUMENTS 3,852,594 A  12/1974 Paolini
4,535,469 A  * 8/1985 Brandt ................. G01N 23/207
                                                      378/81

(Continued)

FOREIGN PATENT DOCUMENTS

CN  109477971 A  3/2019
JP  2005127817 A  5/2005

OTHER PUBLICATIONS

Office Action issued in corresponding Chinese Patent Application No. 2020800270818, mailed Feb. 21, 2024, 24 pages. English translation attached.

*Primary Examiner* — Thomas R Artman
(74) *Attorney, Agent, or Firm* — Leason Ellis LLP (57) ABSTRACT

A beam shaping apparatus (10) for use in an X-ray analysis device (40). The beam shaping apparatus processes an input beam (32) from an X-ray beam source (20), and generates an output beam (34) with an output beam shape for irradiating a sample (112) held by a sample holder (22) of the X-ray analysis device. Movement of the output beam shape is controlled in dependence upon a varying tilt angle ($\chi$) of the sample (112), this defined by a tilt position of the sample holder (22).

13 Claims, 3 Drawing Sheets

(52) U.S. Cl.
CPC ............... *G01N 2223/1016* (2013.01); *G01N 2223/306* (2013.01); *G01N 2223/316* (2013.01); *G01N 2223/3306* (2013.01); *G01N 2223/606* (2013.01); *G01N 2223/607* (2013.01)

(56) References Cited

U.S. PATENT DOCUMENTS

| | | | |
|---|---|---|---|
| 4,592,082 A | | 5/1986 | Pawloski |
| 4,726,047 A | * | 2/1988 | Brouwer .......... G01N 23/20008 378/81 |
| 5,115,460 A | | 5/1992 | De Lange |
| 5,684,857 A | | 11/1997 | De Bokx |
| 7,471,766 B2 | * | 12/2008 | Dosho .................... G01N 23/20 378/71 |
| 10,359,377 B2 | * | 7/2019 | Bykanov ................. G21K 7/00 |
| 10,481,111 B2 | * | 11/2019 | Hench ................ G01N 23/083 |
| 10,782,252 B2 | * | 9/2020 | Gateshki .......... G01N 23/20008 |
| 10,900,912 B2 | * | 1/2021 | Beckers ........... G01N 23/20008 |
| 11,035,805 B2 | * | 6/2021 | Beckers ........... G01N 23/20008 |
| 11,181,490 B2 | * | 11/2021 | Dikopoltsev ......... G01N 23/207 |
| 2011/0255668 A1 | | 10/2011 | Hoghoj et al. |
| 2017/0307548 A1 | | 10/2017 | Bykanov et al. |
| 2018/0113084 A1 | * | 4/2018 | Hench ............. G01N 23/20083 |
| 2019/0317029 A1 | * | 10/2019 | Beckers ........... G01N 23/20008 |
| 2019/0317030 A1 | * | 10/2019 | Beckers ........... G01N 23/20008 |
| 2019/0317031 A1 | * | 10/2019 | Gateshki .......... G01N 23/20008 |
| 2021/0285898 A1 | * | 9/2021 | Dikopoltsev .......... G01B 15/00 |
| 2022/0042933 A1 | * | 2/2022 | Dikopoltsev ......... G01N 23/201 |
| 2022/0163466 A1 | * | 5/2022 | Gateshki ............. G01N 23/207 |
| 2022/0244199 A1 | * | 8/2022 | Osakabe .......... G01N 23/20016 |

\* cited by examiner

$\chi = 0°, \omega = 20°$  $\chi = 80°, \omega = 20°$

FIG. 1

$\chi = 0°, \omega = 20°$  $\chi = 80°, \omega = 20°$

FIG. 2

$\chi = 0°, \omega = 20°$  $\chi = 80°, \omega = 20°$

X-RAY BEAM SHAPING APPARATUS AND METHOD

CROSS-REFERENCE TO RELATED PATENT APPLICATIONS

This application is a U.S. National Phase Application under 35 U.S.C. § 371 of International Patent Application No. PCT/EP2020/059683, filed Apr. 3, 2020, which claims the priority from European Application No. 19167406.8, filed Apr. 4, 2019, all of which are incorporated by reference, as if expressly set forth in their respective entireties herein.

FIELD OF THE INVENTION

The invention relates to an X-ray beam shaping apparatus and beam shaping method.

BACKGROUND OF THE INVENTION

X-ray diffraction (XRD) is an analysis technique for analysing structural and molecular properties of a crystalline sample. In X-ray reflection analysis, a sample is irradiated with an X-ray beam at a certain incidence angle, and a beam diffracted from the sample is detected with a detector. Both an incidence angle of the beam, and a tilt angle of the sample relative to the incident beam can be adjusted.

For certain kinds of analysis, for example texture analysis, a sample may be held in a pivotable sample holder, and tilt angle of a surface of the sample relative to the incidence beam varied through a range of tilt angles.

As a sample held by the sample holder tilts, the incident projection or footprint of the beam on the sample varies in shape, area and position on the sample.

SUMMARY OF THE INVENTION

It has been recognised by the inventors that this varying of the beam footprint on the sample can cause problems in maintaining a consistent irradiation, important for reliable results. In particular, it has been observed by the inventors that the incident radiation can begin to spill over the side of the sample (over-irradiation) as the tilt angle relative to the source increases to larger values. The effect of this is that incident intensity on the sample changes depending upon the sample tilt angle.

Figure 1:
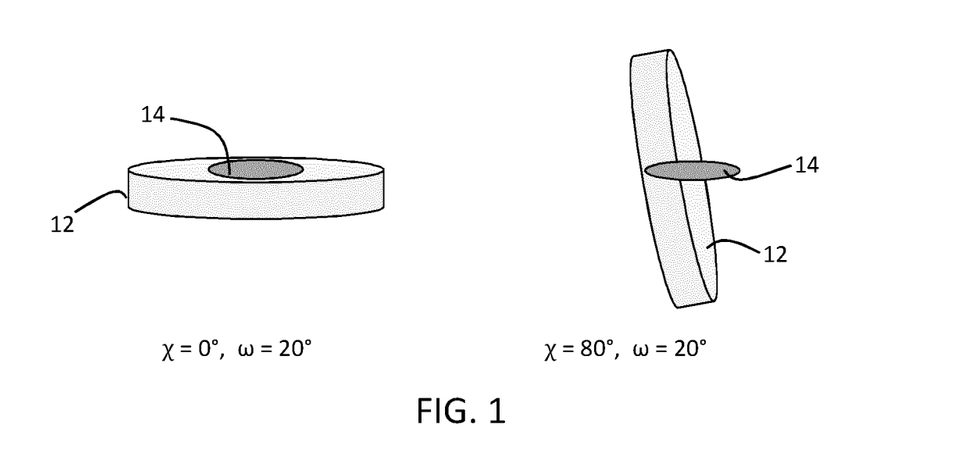
FIGS. 1 and 2 illustrate over-irradiation of a sample at high and low sample tilt angles, respectively.
Figure 2:
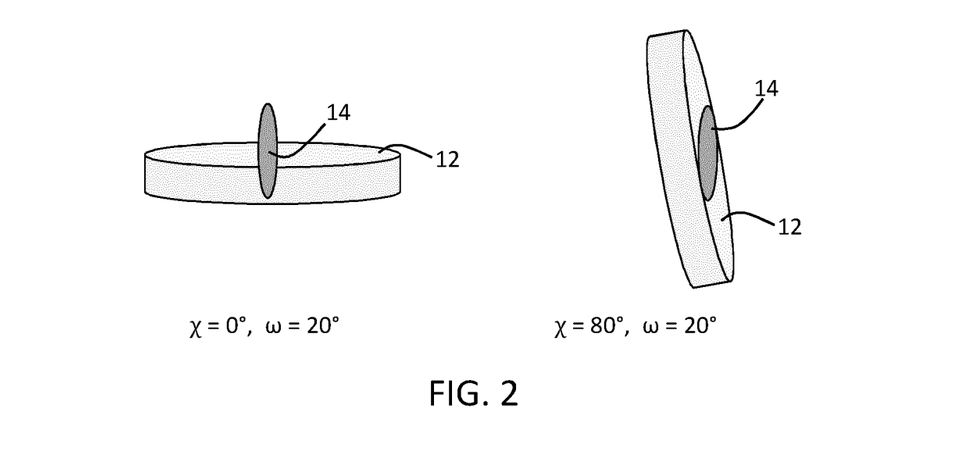

This is illustrated in FIG. 1 and FIG. 2 which each schematically depict irradiation of a sample 12 with an X-ray beam 14 at two different tilt angles, $\chi=0°$, and $\chi=80°$. The incident angle, $\omega$, of the beam in the direction perpendicular to the $\chi$ tilt axis (i.e. in the forwards-backwards direction from the perspective of FIG. 1 and FIG. 2, as opposed to side-to-side) is the same in each of FIG. 1 and FIG. 2 ($\omega=20°$).

In FIG. 1, the axial beam width is too wide for the sample 12 at high tilt angles ($\chi=80°$), causing over-spill of the beam. In FIG. 2, the equatorial beam size is too large for the sample at lower tilt angles ($\chi=0°$), again leading to over-spill of the beam.

Figure 3:
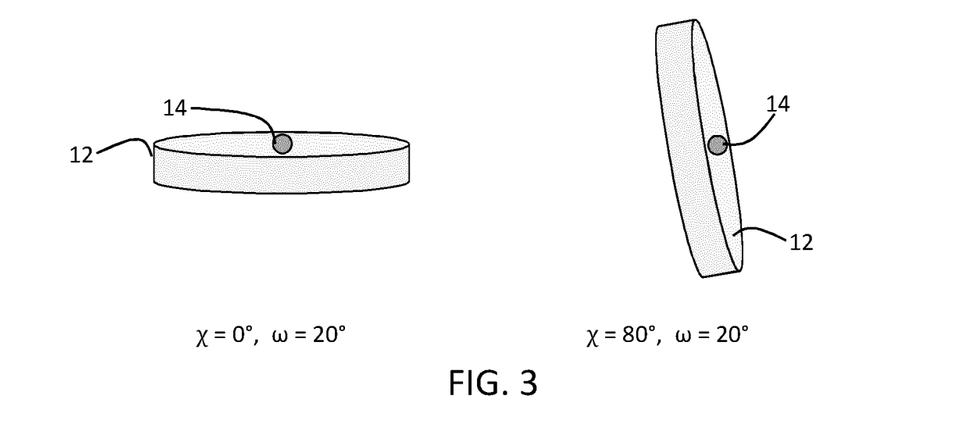
FIG. 3 illustrates a conventional approach to solving over-irradiation, based on reducing the beam size.

The typical way of avoiding this over-irradiation, and so maintaining consistent incident intensity, is to deliberately reduce the beam 14 size in both equatorial and axial directions. This is illustrated in FIG. 3. Typical reduced-size beam cross-section sizes may be, for instance, 1×1 mm or 0.5×0.5 mm. By contrast, the total generated beam size might typically be in the order of 1×1 mm instead of 1×1 mm. Hence, only a small part of the total generated beam width is used, which reduces the size of the incident beam footprint on the sample 12. This thus reduces the total radiation flux (and the intensity of radiation) incident on the surface, which leads to a lower power output signal. As a result, signal to noise ratio is reduced.

The inventors have realised therefore that an improved solution to the problem of over-irradiation of the sample would be of value.

The invention is defined by the claims.

According to examples in accordance with an aspect of the invention, there is provided a beam shaping apparatus for use in an X-ray analysis device, wherein the X-ray analysis device comprises a sample holder, for holding a sample at a variable tilt angle about a tilt axis. The beam shaping apparatus comprises a beam shaping element, adapted to receive an input beam from an X-ray source and generate an output beam having an output beam shape, and a controller operatively coupleable in use with the X-ray analysis device. The controller is adapted to control movement of the output beam shape dependent upon the variable tilt angle of the sample.

Embodiments of the present invention are based on providing a beam shaping element with a shaped output which is controlled to move in dependence upon the tilting of the sample. By introducing movement of the output beam shape, and tying the movement to the changes in the sample tilt angle, this provides a mechanism by which the beam footprint can be maintained on the sample surface, without spilling over the side of the sample, regardless of the sample tilt angle. This ensures that the X-ray intensity falling on the sample is maintained as consistently high as possible.

The controller may be adapted to control movement of the output beam shape in correlation with the variable tilt angle of the sample. In other words, the movement of the output beam shape may be controlled so as to be correlated with the varying tilt angle of the sample. There may be a fixed or defined correlation function or relationship between the movement of the output beam shape and the tilt angle of the sample.

The controller may be adapted to control the movement of the output beam shape so as to maintain an incident footprint of the beam on a sample held in use by the sample holder within a boundary of the surface of the sample.

Reference herein to an output beam shape is to the cross-sectional shape of the output beam.

The controller may be adapted to receive an input signal from the X-ray analysis device indicative of the tilt angle of the sample, or of the sample holder, about the tilt axis and to control the movement of the output beam shape based on (or using) said input signal. The controller may generate one or more output signals for controlling the movement of the output beam shape based on the input signal. If the sample holder is adapted to hold the sample in a fixed position relative to the sample holder, a signal indicative of a tilt angle of the sample holder also provides an indication of tilt angle of the sample itself. Thus this signal would provide the necessary indication of the tilt angle of the sample.

The controller may be configured to control the tilt angle of the sample holder (and thus the sample) in addition to the movement of the output beam shape.

The apparatus may be particularly advantageous for performing X-ray diffraction analysis. More particularly, the apparatus may be particularly advantageous for use for performing texture or stress analysis of a sample using X-ray diffraction. In such procedures, rotation of the sample about a range of tilt angles is typically performed to enable analysis along different crystal orientations with respect to the surface.

The movement of the output beam shape may include rotation. The movement may consist of or be rotation. The controller may be adapted to control rotation of the output beam shape to rotate in congruence with the variable tilt angle of the sample. For example, the controller may be adapted to control rotation of the output beam shape to rotate in correlation with the variable tilt angle of the sample, i.e. so that the rotation of the output beam shape is correlated with the varying tilt angle of the sample. There may be a fixed or defined correlation function or relationship between the rotation of the output beam shape and the tilt angle of the sample.

The rotation may be controlled to follow congruently, or in correlation with, the tilting of the sample in such a way as to adjust the beam incident footprint for the changing sample rotation angle. By rotating the beam shape and sample in congruence or correlation with one another, this can help the beam footprint to be maintained on the sample surface with reduced variation in the irradiation area regardless of the sample tilt angle. An aim is to minimize the change in the irradiation area as the tilt angle varies. This ensures consistently high radiation intensity at all tilt angles.

Additionally or alternatively, the movement may include translation. This may permit adjustment of a positioning of the incident beam footprint on the irradiated sample. This may, for example, assist in maintaining the beam footprint within the boundaries of the sample surface, and thus maintaining consistently high radiation intensity on the sample.

According to one or more examples, the beam shaping element may be moveable, and wherein the movement of the output beam shape may be achieved by movement of the beam shaping element within the beam. More particularly, the beam shaping element may be arranged to be moveable within the input beam, and wherein the movement of the output beam shape by the controller may be achieved by controlling movement of the beam shaping element within the input beam. For example, the beam shaping element may be rotatable, and rotation of the output beam shape may be achieved by rotation of the beam shaping element within the input beam.

The beam shaping element may comprise a mask element.

Other examples include a lens or other lenticular element, having a rotationally anisotropic optical output, that is, an element wherein the output radiation pattern or shape varies depending upon the rotation of the optical element.

The beam shaping element may be rotatable in a plane oriented transverse or cross-wise the optical axis of the input beam, meaning a plane which is intersected by the optical axis. Reference herein to an optical axis is reference to, for example, a central axis of the input beam; an axis defining the direction of propagation of the input beam.

Physically moving the beam shaping element within the input beam is just one way of providing a moveable output beam shape. In other examples, the beam shaping element may have an adjustable internal optical configuration for implementing the movement, for example for implementing rotation. For example, the beam shaping element may comprise an ordered arrangement of optical elements, each being individually addressable, and being co-operatively arranged such that an apparent movement (e.g. rotation) of the output beam shape is achievable by iteratively changing which subset of the elements is activated at any given time. These options will be explained in further detail to follow.

The beam shaping element may be moveable in a plane perpendicular to a direction of the beam. For example, the beam shaping element may be rotatable in a plane perpendicular to a direction of the beam.

The beam shaping element may be rotatable about an axis coinciding with an axis of the input beam. The axis of the input beam means an axis along the direction of travel of the beam, i.e. parallel and preferably coincident with the beam propagation direction.

The beam shaping apparatus may comprise one or more actuators configured to implement the movement of the output beam shape, for example configured to implement rotation of the output beam shape.

The actuators may be configured to implement movement of the beam shaping element within the beam path to implement the movement of the output beam shape. For example the actuators may be configured to implement rotation of the beam shaping element within the beam path to implement rotation of the output beam shape.

In advantageous examples, the output beam shape may be an elongate shape, defining a longitudinal axis and a transverse axis.

The longitudinal axis of the beam shape refers to an axis extending along the length of the shape. The transverse axis refers to an axis extending across the width of the shape.

By shaping the beam to have an elongate (and therefore, narrow width) cross-section, this makes it easier to avoid over-spill of the beam over the side of the sample, even at large tilt angles. As the sample tilt angle increases to higher values, the optically available area (the area 'visible' within the line of sight of the X-ray source) for projection of the beam onto the sample becomes narrower. A narrow beam shape thus makes it easier to ensure the full beam area is directed onto the sample surface, regardless of the tilt. Over-irradiation can thus be avoided without the need to restrict the total beam cross-sectional area.

Elongate takes its normal meaning, namely that the beam cross-section is longer (in the longitudinal direction) than it is wide (in the transverse direction). In some examples, the beam shape may have a length at least two times its width.

The controller may be configured to control rotation of the output beam shape so as to maintain the longitudinal axis substantially parallel with a plane defined by a surface of a sample held in use by the sample holder.

In some examples, the rotation necessary to achieve this may depend in part upon the angle of incidence of the beam on the sample. It may depend in part upon the relative orientations and/or positions of the sample holder and the beam source, and/or upon the axis of rotation of the output beam shape.

Substantially parallel may mean for instance parallel, plus or minus reasonable tolerances, for example parallel, plus or minus up to 5°.

As mentioned above, according to one or more embodiments, the beam shaping element may comprise a mask element.

The mask element may comprise a plate, for instance an X-ray opaque plate. The plate may have a shaped X-ray transmissive output area, for forming the output beam shape. The X-ray transmissive output area may be an open space through the mask, or may be a window comprising an X-ray transmissive material.

This may provide a simple arrangement which is easy to manufacture and facilitates a simple control mechanism in use. Rotation of the output beam shape may be achieved by rotating the mask element within the X-ray beam about the beam axis.

The mask element may define an X-ray transmissive slit.

According to one or more advantageous embodiments, the controller may be configured to control the movement of the output beam shape such that an area and/or shape of a footprint of the beam formed on a sample held in use by the sample holder changes less, across a defined range of tilt angles, than it would if the output beam shape remained stationary. For example, the controller may be configured to implement rotation of the output beam shape such that said area of the beam footprint, or the shape of the beam footprint remains substantially constant.

In this embodiment, the controller computes the rotation so as to reduce variation in the incident irradiated area, or in the shape of the incident irradiated area, on the sample as the tilt angle is changed, compared to the variation that would occur if there were no movement of the output beam shape. This in turn ensures a consistently high incident radiation intensity is maintained, since a consistently large beam size can be used without the beam spilling over the side of the sample at certain tilt angles.

For example, the tilting of the sample, held by the sample holder, may be such that, without movement of the output beam shape, the area of the beam footprint on a sample held in use by the sample holder would exhibit a (for example, maximum) variation of a certain amount (e.g. plus or minus a certain percentage of its starting value) across the defined range of tilt angles. This embodiment provides that the movement of the output beam shape is such that, when implemented across said defined range of tilt angles, this variation is reduced.

Additionally or alternatively, the tilting of the sample, held by the sample holder, may, by way of example, be such that without movement of the output beam shape, the length to width ratio (i.e. shape) of the beam footprint on a sample held in use by the sample holder would exhibit a (for example, maximum) variation of a certain amount (e.g. plus or minus a certain percentage of its starting value) across the defined range of tilt angles. This embodiment provides that the movement of the output beam shape is such that, when implemented across said defined range of tilt angles, this variation is reduced. Here, length refers to a longest dimension across the beam footprint, and width refers to a shortest dimension across the beam footprint (or alternatively, a dimension at right angles to the length dimension).

In advantageous examples, the defined range of tilt angles may for instance be from 0° to 80°. Any other range of tilt angles may be selected in other examples.

The controller may be configured to control the movement of the output beam shape such that an amount of flux incident on the sample remains substantially constant across a defined range of tilt angles.

Substantially constant may mean, for example, that the total incident radiation flux remains constant, plus or minus reasonable tolerances, such as for example plus or minus 5% or plus or minus 10% or plus or minus 20%. These figures are exemplary only, and any desired tolerance may be used. The controller may be programmed with the required tolerances for the total incident radiation.

The amount of flux means the amount of incident radiation, that is, the number of photons hitting the sample.

In some examples, the rotation necessary to achieve this may depend in part upon the angle of incidence of the beam relative to the source. It may depend in part upon the relative orientations and/or positions of the sample, the beam source, and/or upon the rotation of the output beam shape.

In advantageous examples, the defined range of tilt angles may for instance be from 0° to 80°.

Additionally or alternatively, according to one or more embodiments, the controller may be configured to control the movement of the output beam shape so as to maintain an incident footprint of the beam within a boundary of a surface of a sample held in use by the sample holder. For example, the controller may be configured to control rotation of the output beam shape so as to maintain said incident footprint of the beam within said boundary.

In this example, the controller determines a rotation of the output beam shape so as to avoid the beam spreading over the edges of the incident surface of the sample. This thus avoids over-irradiation of the sample.

Examples in accordance with a further aspect of the invention provide an X-ray analysis device comprising:
- a sample holder, for holding a sample at an adjustable tilt angle about a tilt axis;
- an X-ray source;
- a beam shaping element adapted to receive an input beam from the X-ray source, and generate an output beam having an output beam shape, the sample holder being arranged to receive the output beam, and
- a controller, operatively coupled with the X-ray analysis device and adapted to control movement of the output beam shape in dependence upon the variable tilt angle.

Examples in accordance with a further aspect of the invention provide a method of controlling a beam shaping apparatus, the apparatus for use in an X-ray analysis device. The X-ray analysis device comprises a sample holder, for holding a sample at a variable tilt angle about a tilt axis. The beam shaping apparatus comprises a beam shaping element, adapted to receive an input beam from an X-ray source and generate an output beam having an output beam shape. The method comprises obtaining the tilt angle of the sample about the tilt axis, and controlling movement of the output beam shape in dependence upon the variable tilt angle, based on the obtained signal.

Obtaining the tilt angle of the sample may comprise obtaining from the X-ray analysis device a signal indicative of the tilt angle of the sample about the tilt axis.

In some examples, obtaining the tilt angle of the sample may comprise obtaining from the X-ray analysis device a signal indicative of a tilt angle of the sample holder about the tilt axis. If the sample is held in a fixed position relative to the sample holder, this tilt angle of the sample holder also provides an indication of the tilt angle of the sample about the tilt axis.

In some examples, the tilting of the sample (e.g. by means of tilting of the sample holder) and the movement of the beam shaping element may be controlled by a central controller and/or in accordance with a single control program or software program. In this case, obtaining the tilt angle, $\chi$, may comprise simply referencing or accessing the tilt angle known by, or defined by, the controller or software. In other examples, the tilt angle may be obtained, for example, by communicating with an external tilt controller.

Examples in accordance with a further aspect of the invention provide a computer program product comprising computer program code wherein, when the code is executed on at least one physical computing device, and the at least one physical computing device is operatively coupled with a beam shaping apparatus as defined in the beam shaping method outlined above, the code causes the at least one physical computing device to carry out the method defined in the example beam shaping method outlined above.

The computer program product is preferably stored on a non-transitory computer-readable medium.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a beam shaping apparatus for use in an X-ray analysis device. The beam shaping apparatus processes an input beam from an X-ray beam source, and generates an output beam with an output beam shape for irradiating a sample held by a sample holder of the X-ray analysis device. Movement of the output beam shape is controlled dependent upon a varying tilt angle of the sample, this defined by a tilt position of the sample holder.

By implementing controlled movement of the output beam shape in dependence upon the sample tilt angle, changes in tilt of the sample can be compensated for, enabling the problems of over-irradiation to be reduced. In particular, this provides for maximising irradiation of the sample (maximising incident flux or intensity) without over-irradiating the sample.

Figure 4:
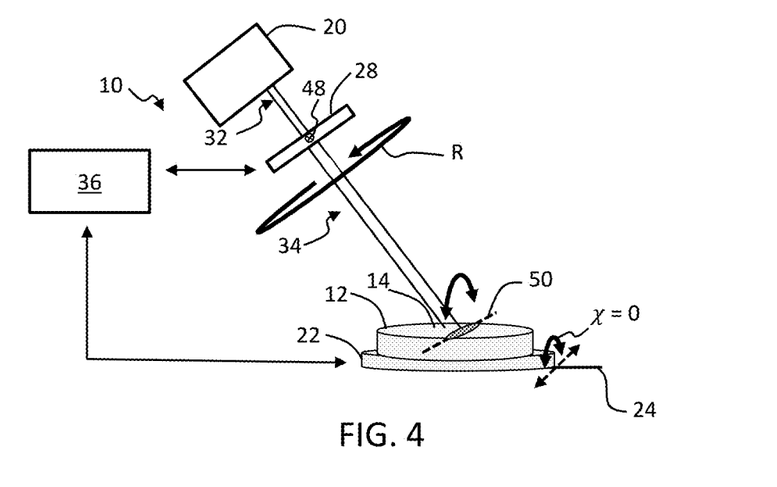
FIG. 4 illustrates a perspective view of an example beam shaping apparatus according to one or more embodiments, shown in use with an X-ray analysis device.

FIG. 4 illustrates one example beam shaping apparatus 10 in accordance with one or more embodiments of the invention. For illustration, the beam shaping apparatus 10 is shown in use, installed within an X-ray analysis device, comprising an X-ray source 20. The X-ray analysis device further comprises a sample holder 22 which is adapted to hold a sample 112 to be irradiated at a variable tilt angle, $\chi$, about a tilt axis 24.

The beam shaping apparatus 10 comprises a beam shaping element 28, and a controller 36 operatively coupled to the beam shaping element and further operatively coupled with at least the sample holder 22 part of the X-ray analysis device. The beam shaping element 28 is adapted to receive an input beam 32 from an X-ray source 20, and generate an output beam 34 having an output beam shape. The beam shaping element is positioned in the path of the input beam 32 generated by the X-ray source 20, between the X-ray source and the sample holder. In use, the beam shaping element 28 is positioned such that the generated output beam 34 is directed toward the sample holding area of the sample holder 22.

The controller 36 is adapted to control movement of the output beam shape in dependence upon the variable tilt angle of the sample, held by the sample holder 22.

In some examples, the sample holder may be adapted to hold a sample at a fixed position (in particular a fixed angular position) relative to the sample holder. In this case, a tilt angle of the sample holder itself at any given time can also be used to provide an indication of the tilt angle of the sample held by the sample holder. In some examples, the sample holder may hold the sample such that a tilt angle of (e.g. an incident surface of) the sample at all times matches a tilt angle of the sample holder about the tilt axis 24. There may be a known or pre-defined relationship (e.g. angular offset) between the tilt angle of the sample holder and the tilt angle of the sample, so that a tilt angle of the sample can be directly determined from a tilt angle of the sample holder.

The controller 36 may be adapted in use to receive an input signal from the X-ray analysis device indicative of the tilt angle, $\chi$, of the sample, or the sample holder 22, about the tilt axis 24 and to control the movement of the output beam shape based on (or using) said input signal. As explained above, if the sample is held fixed in the sample holder, this has the effect that the output beam shape is moved in dependence upon the tilt angle of the sample. The controller may generate one or more output signals for controlling the movement of the output beam shape based on the input signal.

The beam shaping element 28 may have an adjustable optical configuration which defines the movement position of the output beam shape. This may include a physical position and/or orientation of the beam shaping element within the input beam 32, or may include an internal optical arrangement of the beam shaping element.

Figure 5:
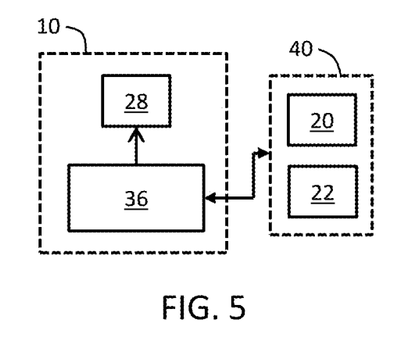
FIG. 5 shows the example beam shaping apparatus and the X-ray analysis device in block diagram form.

FIG. 5 shows a block diagram of the basic components of the beam shaping apparatus 10, including the controller 36, operatively coupled to the beam shaping element 28. FIG. 5 further shows an X-ray analysis device 40, as outlined above, with which the controller 36 is operatively coupleable in use. The controller is shown in use, operatively coupled with the X-ray analysis device 40 for receiving information indicative of a current tilt angle, $\chi$, of the sample, or of the sample holder 22.

As shown in FIG. 4, in this example, the X-ray analysis device is arranged such that the tilting the sample, held in the sample holder 22, about the tilt axis 24 is in a plane orientated transverse the output beam 34 direction. This means that the tilting of the sample, held by the holder, is from side-to-side relative to the beam.

According to an advantageous set of embodiments, the movement of the output beam shape includes at least rotational movement. The rotation is preferably axial rotation of the output beam shape, about an axis defining a direction of the output beam 34.

The controller 36 may in particular be adapted to control rotation of the output beam shape to rotate in congruence or correlation with the variable tilt angle of the sample. Here, the rotation of the output beam shape may be controlled with a defined relationship with respect to the tilt angle, $\chi$, of the sample, held by the sample holder 22, such that change in the tilt angle leads to a defined rotation response in the output beam shape. In some examples, the rotation of the output beam shape may be controlled with a defined relationship with respect to a tilt angle of the sample holder 22.

The defined relationship is preferably one-to-one, so that changes in the rotation angle are controlled to be the same as (that is, to match) changes in the tilt angle of the sample or sample holder. Other relations, however, are also possible.

The beam shaping and movement of the output beam shape may be implemented in different ways.

Figure 6:
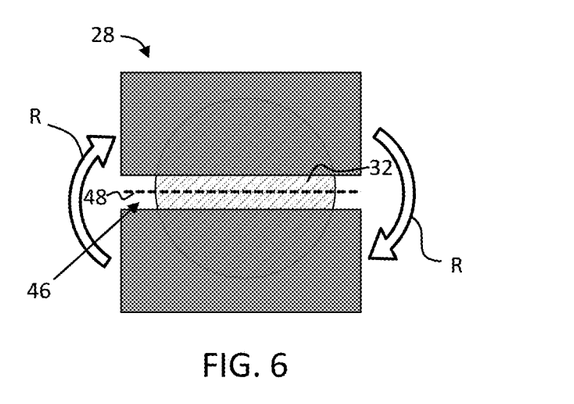
FIG. 6 illustrates an example beam shaping element according to one or more embodiments.
Figure 7:
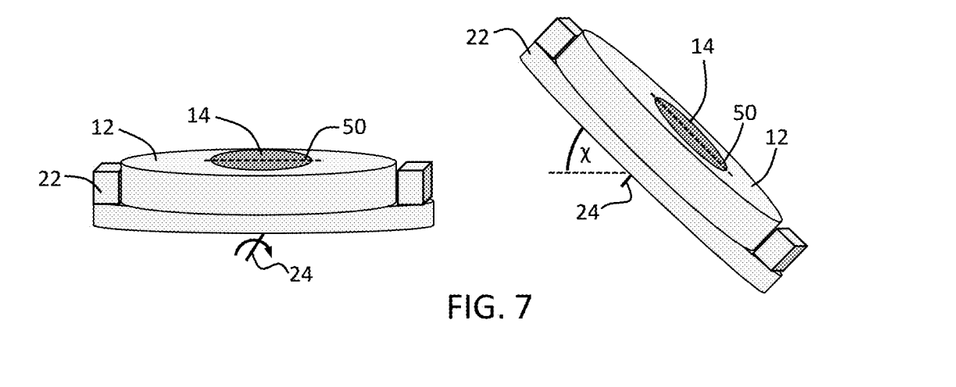
FIG. 7 illustrates rotation of the output beam shape in congruence or correlation with the tilt angle of the sample to avoid over-irradiation.

One advantageous example is illustrated by FIG. 6 and FIG. 7. FIG. 6 shows an example beam shaping element 28 according to one or more embodiments.

In this embodiment, the beam shaping element 28 comprises a beam shaping mask. The mask is formed of an X-ray opaque sheet or plate delimiting an X-ray transmissive slit 46. The beam shaping element is placed in use in the path of the input beam 32 generated by the X-ray source 20. The slit 46 shapes the beam into an output beam 34 with an elongate output beam shape. The elongate output beam shape has a longitudinal axis along its longer dimension, this being parallel with a longitudinal axis 48 of the X-ray transmissive slit. The longitudinal length of the slit 46 may be at least two times its (transverse) width in some examples.

The beam shaping mask 28 is controlled to rotate within the beam path of the input beam 32, to thereby implement controlled rotation of the output beam 34 shape. The rotation of the beam shaping element 28 may be implemented for example with a rotation mechanism comprising one or more actuators. The rotation R may be in a plane perpendicular the input beam.

By controlling the rotation of the beam shaping element 28 to rotate in congruence or correlation with rotation (tilting) of the sample, held by the sample holder 22, about the tilt axis 24, the footprint 114 of the output beam 34 may be maintained within the boundaries of the sample 112 held by the sample holder 22, without over-irradiation.

This is illustrated in FIG. 7 which shows a sample 112 held in a sample holder 22 which is being irradiated by an output beam which has been shaped into an elongate beam shape by a mask element in accordance with FIG. 6. FIG. 7 shows a view of the sample holder and sample along the direction of the incident beam (the beam direction is 'into the page' from the perspective of FIG. 7). The longitudinal axis 50 of the output beam shape is illustrated within the incident beam footprint 114 in FIG. 7.

FIG. 7 shows the sample holder (and, in this example, the sample held by the sample holder) at two different tilt angles, $\chi=0°$ (left) and $\chi=30°$ (right). As shown, the output beam shape is controlled to rotate in congruence or correlation with the changing of the tilt angle, $\chi$. As a result, the elongate footprint 114 of the beam on the sample surface also rotates in congruence or correlation with the changing tilt, with the effect that the beam footprint remains within the boundaries of the sample surface and over-spill of the beam over the side of the sample 112 is avoided. As a result, the incident X-ray intensity of the beam remains substantially constant regardless of tilt angle.

As the tilt angle, $\chi$, of the sample (and in this case also the sample holder 22) increases to higher values, the optically available area of the sample surface (the area within the 'line of sight' of the output beam 34) becomes increasingly narrow. Shaping the output beam 34 to have an elongate (i.e. narrow) shape therefore is advantageous in allowing the beam footprint 114 to be kept within the boundaries of the sample 112 surface regardless of the tilt angle. In particular, a narrow beam shape makes it easier to ensure the full beam area is directed onto the sample surface, regardless of the tilt. Maintaining the beam on the sample surface requires only rotating the beam shape such that the longitudinal axis 50 of the elongate beam shape remains parallel with a plane defined by the surface of the sample 112.

Over-irradiation can thus be avoided without the need to restrict the total beam cross-sectional area.

In addition, embodiments of the present invention enable an overall size and shape of the beam footprint formed on the sample surface to be more consistently maintained, throughout rotation of the sample. This in turn allows an incident radiation intensity on the sample to be maintained more constant, improving measurement reliability and stability.

In particular, in examples, the controller may be configured to control the movement of the output beam shape such that an area and/or shape of a footprint of the beam formed on a sample held in use by the sample holder changes less, as the tilt angle varies through a defined range of tilt angles, than it would if the output beam shape remained stationary.

Figure 8:
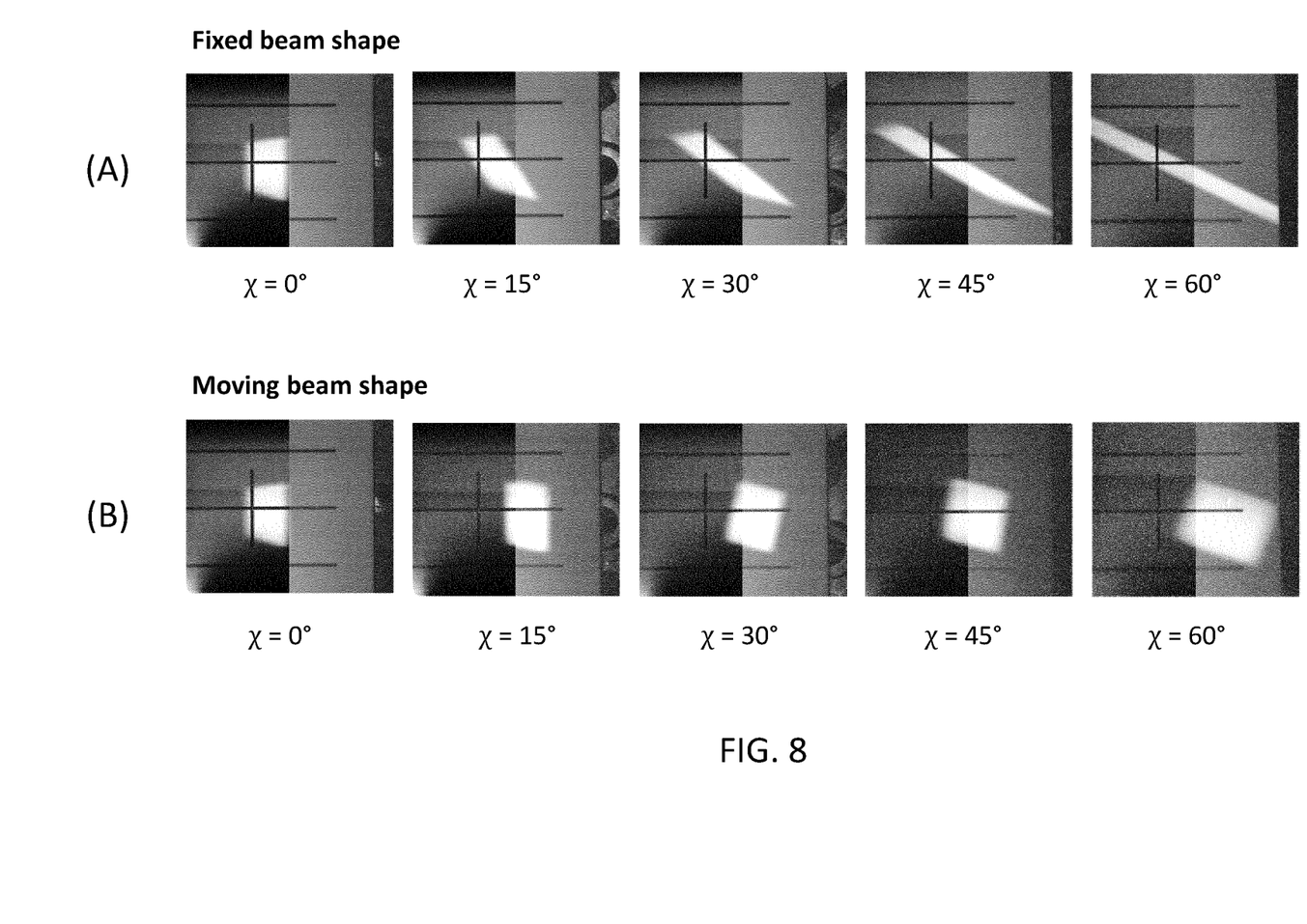
FIG. 8 shows a comparison of example beam footprints formed on a surface of a sample at a range of tilt angles for an arrangement without a moving output beam shape, and an arrangement with a moving output beam shape.

This is illustrated in FIG. 8 which shows a comparison of example beam footprints formed on a surface of an irradiated sample for a set-up which includes a rotating output beam shape (in accordance with embodiments of the invention), and for a (standard) set-up with only a static output beam shape.

Row A shows the beam footprints (lighter area) formed at a series of tilt angles, $\chi$, of the sample where the apparatus has a fixed output beam shape. Row B shows the beam footprints (lighter area) formed at a series of tilt angles, $\chi$, where the output beam shape is being rotated in congruence or correlation with the tilting of the sample.

The beam size in this example is 1.5 mm×7 mm.

As illustrated, with the use of the rotating output beam shape, the irradiated area of the beam footprint (both in terms of size and shape) remains more consistent throughout the range of tilt angles. It can also be seen that the beam footprint is maintained within the boundaries of the sample surface at larger tilt angles for the rotating output beam shape set-up.

In particular, it can be seen that with application of the rotating output beam shape, a variation in a length to width ratio (i.e. shape) of the beam footprint is reduced compared to the set-up without the rotating output beam shape. Here, length refers to a longest dimension across the beam footprint, and width refers to a shortest dimension across the beam footprint (or alternatively, a dimension at right angles to the length dimension).

The controller 36 may be configured to compute a required rotation path or program for the output beam shape based on the tilt angle and potentially one or more other factors.

Although the above example comprises a beam shaping element 28 in the form of beam shaping mask, the beam shaping element may take different forms in other examples.

Other examples include for instance an X-ray lens or other lenticular element, having a rotationally anisotropic optical output, that is, an element wherein the output radiation pattern or shape varies depending upon the rotation of the optical element.

The beam shaping element 28 may comprise a polycapillary X-ray lens in some examples.

Furthermore, although in the above example, the movement of the output beam shape is implemented by physically moving the beam shaping element within the input beam 32, the movement of the output beam shape may be implemented in other ways.

For example, the beam shaping element 28 may comprise an ordered arrangement of optical elements, each being individually addressable, and being co-operatively arranged such that an apparent movement (e.g. rotation) of the output beam shape is achievable by iteratively changing which subset of the elements is activated at any given time.

For instance, the beam shaping element 28 may comprise a carrousel or slider of differently angled slits, permitting the differently angled slits to be selectively slid in front the input beam 32.

Alternatively, the beam shaping element 28 may comprise an ordered stack of differently angled slits, wherein each slit is formed by jaws moveable toward or away from one another. To select a particular slit orientation, the jaws of one of the slits are moved toward one another, to thereby define a beam shaping slit at the corresponding angle, while those of all of the others are pulled open, so that the full X-ray beam passes through these without being shaped.

Furthermore, although a slit is used to generate an elongate output beam shape in the above example, an elongate shape may be generated in a different way using any other kind of beam shaping element.

The above example illustrates implementing a movement scheme of the output beam shape which comprises rotational movement. In further examples, the output beam shape may additionally or alternatively be controlled to move with translational movement. For example, the output beam shape may be controlled to move translationally within a plane perpendicular to a direction of the input beam 32.

Implementing translational movement of the output beam shape may enable adjustment of a translational position of the beam footprint 114 on the irradiated surface of the sample 112 in use. This provides an additional degree of freedom for adjusting the beam footprint positioning, enabling the footprint to be more easily maintained within boundaries of the sample 112 surface in use. This ensures that the incident radiation intensity on the sample 112 in use can be maintained as consistent and high as possible.

Translational motion of the output beam shape may be implemented in addition to rotational motion, or may be implemented instead of rotational motion in some examples.

Translational motion of the output beam 34 shape may be implemented using a beam shaping element 28 in the form of a beam shaping mask, such as the example in FIG. 6. This may be achieved by controlling translational movement of the beam shaping mask within the beam path within a plane perpendicular the input beam 32 direction.

According to one or more embodiments, the beam shaping element 28 may be provided in combination with an X-ray lens or X-ray mirror arrangement, the latter for performing pre-shaping of the input beam 32, or adjusting a directionality of the input beam, in advance of the shaping performed by the beam shaping element.

A poly-capillary X-ray lens may be provided for forming a parallel input beam for receipt by the beam shaping element 28. This provides a resulting output beam 34 having parallel beam optics.

A 2D X-ray mirror may be provided for shaping or directing the input beam for receipt by the beam shaping element 28. This may be a parabolic mirror for example, for forming a parallel beam. This may facilitate use of the generated output beam 34 for X-ray diffraction analysis using parallel beam optics.

Parallel beam optics are particularly advantageous for stress or texture analysis of a sample.

An aim of embodiments of the present invention is to control movement of the output beam path in dependence upon the variable tilt angle of a sample held by a sample holder 22 so as to maintain an incident intensity of radiation on the sample 112 as consistent and high as possible.

Achieving this may include controlling the movement of the output beam shape so as to maintain the beam footprint incident on the sample within boundaries of the sample surface (i.e. to avoid over-spill).

A simple approach to achieving this may comprise, for instance, controlling rotation of the output beam shape with a rotation which matches the tilt angle of the sample. In some examples, this may comprise for instance controlling rotation of the output beam shape with a rotation which matches a tilt angle of the sample holder 22 which holds the sample.

As mentioned above, the sample holder may be adapted to hold a sample at a fixed position (in particular, a fixed angular position) relative to the sample holder. Thus the tilt angle of the sample holder at any given time may also provide an indirect indication of the tilt angle of the sample in the sample holder. In some examples, the sample holder may hold the sample such that a tilt angle of (e.g. an incident surface of) the sample at all times matches the tilt angle of the sample holder about the tilt axis 24, or is at a pre-defined angular offset with respect to the tilt angle of the sample holder.

In some examples, the controller 36 may be adapted to identify or determine a spatial positioning of a plane defined by a surface of a sample 112 held by the sample holder 22 based on a received indication of a tilt angle of the sample holder. This may be a spatial positioning relative to the output beam 34 path or beam shaping element 28 for instance. This may include an orientation of the sample surface plane. The spatial positioning of the sample surface plane may be monitored, and changes in the positioning detected.

By knowing where the surface of the sample is located relative to the output beam, it may be possible to compute the position and size of the beam footprint on the sample surface at a given time. This might, in some examples, be used for informing the rotation of the output beam shape.

In a further aspect of the invention, an X-ray analysis device 40 may be provided which includes a beam shaping apparatus 10 in accordance with any embodiment described herein. For example, the X-ray analysis device 40 may take the form as schematically depicted in FIG. 4 above.

A polycapillary X-ray lens or parabolic X-ray mirror arrangement may additionally be included as part of the X-ray analysis device 40, arranged to process the input beam 32 in advance of receipt of the beam by the beam shaping element, to thereby provide to the beam shaping element a parallel X-ray beam. This enables X-ray analysis to be performed using the device with parallel beam optics.

A single central controller 36 may be provided, configured to control both the changing tilt angle of the sample, e.g. by controlling a changing tilt angle of the sample holder 22, and the movement of the output beam 34 shape. Alternatively, separate control elements may be provided for implementing these two functionalities, the two operatively coupled, such that the beam shaping element 28 controller may obtain or receive from the tilt angle controller a signal indicative of a tilt angle of the sample, or of the sample holder 22. As explained above, the latter may be used to provide an indication also of the tilt angle of the sample held in the sample holder.

Examples in accordance with a further aspect of the invention provide a method of controlling a beam shaping apparatus, the apparatus for use in an X-ray analysis device, wherein the X-ray analysis device comprises a sample holder 22, for holding a sample 112 at a variable tilt angle, $\chi$, about a tilt axis 24.

The beam shaping apparatus 10 comprises a beam shaping element 28, adapted to receive an input beam 32 from an X-ray source 20 and generate an output beam 34 having an output beam shape. The beam shaping element may be a beam shaping element in accordance with any embodiment or example described above, or in accordance with any claim of this application.

The method comprises obtaining the tilt angle of the sample, held by the sample holder, about the tilt axis and controlling movement of the output beam shape in dependence upon the variable tilt angle.

Obtaining the tilt angle of the sample may comprise obtaining from the X-ray analysis device a signal indicative of the tilt angle of the sample about the tilt axis.

In some examples, obtaining the tilt angle of the sample may comprise obtaining from the X-ray analysis device a signal indicative of a tilt angle of the sample holder about the tilt axis. If the sample is held in a fixed position relative to the sample holder, this tilt angle of the sample holder also provides an indication of the tilt angle of the sample about the tilt axis.

In some examples, the tilting of the sample (by means of tilting the sample holder) and the movement of the beam shaping element may be controlled by a central controller and/or in accordance with a single control program or software program. In this case, obtaining the tilt angle, $\chi$, may comprise simply referencing or accessing the tilt angle known by, or defined by, the controller or software. In other examples, the tilt angle may be obtained for example by communicating with an external tilt angle controller.

The movement may preferably include rotation, wherein the controller is adapted to control rotation of the output beam shape to rotate in congruence or correlation with the variable tilt angle, $\chi$, of the sample (e.g. by controlling the rotation of the output beam shape in congruence or correlation with the tilt angle of the sample holder 22).

The beam shaping apparatus according to embodiments of the present invention may be particularly advantageous for use for performing X-ray diffraction analysis. More particularly, the apparatus may be particularly advantageous for use for performing texture or stress analysis of a sample using X-ray diffraction. In such procedures, rotation of the sample about a range of tilt angles is typically performed to enable analysis along different crystal orientations Different geometrical configurations are possible when conducting XRD analysis, which are useful for measuring different types of properties. One type of geometry is parallel beam geometry, in which a parallel (that is, non-divergent) X-ray beam is directed onto the sample. Parallel beam geometry is particularly useful for sample stress and texture analysis, and depth profiling. It can achieve higher quality results particularly for rough samples with non-constant surface height or layered samples. Embodiments of the present invention may be particularly advantageous for use in parallel beam geometry configurations.

As discussed above, embodiments make use of a controller. The controller can be implemented in numerous ways, with software and/or hardware, to perform the various functions required. A processor is one example of a controller which employs one or more microprocessors that may be programmed using software (e.g. microcode) to perform the required functions. A controller may however be implemented with or without employing a processor, and also may be implemented as a combination of dedicated hardware to perform some functions and a processor (e.g. one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A beam shaping apparatus (10) for use in an X-ray analysis device (40), wherein the X-ray analysis device comprises a sample holder (22), for holding a sample (112) at a variable tilt angle ($\chi$) about a tilt axis (24),
the beam shaping apparatus (10) comprising:
a beam shaping element (28) adapted to receive an input beam (32) from an X-ray source (20), and generate an output beam (34) having an output beam shape, and
a controller (36) operatively coupleable in use with the X-ray analysis device (40),
the controller (36) adapted to control movement of the output beam shape dependent upon the variable tilt angle ($\chi$) of the sample (112),
wherein the output beam shape is an elongate shape, the elongate shape having a length and a width, wherein the length is longer than the width, and the output beam shape defining a longitudinal axis (50) extending along the length and a transverse axis extending along the width, and wherein the movement includes rotation, and wherein the controller (36) is configured to control rotation of the output beam shape so as to maintain the longitudinal axis (50) substantially parallel with a plane defined by a surface of a sample (112) held in use by the sample holder (22).

2. The apparatus (10) of claim 1, wherein the controller (36) is adapted to control rotation of the output beam shape to rotate in correlation with the variable tilt angle ($\chi$) of the sample (112).

3. The apparatus (10) of claim 1, wherein the beam shaping element (28) is arranged to be moveable within the input beam (32), and wherein the movement of the output beam shape by the controller (36) is achieved by controlling movement of the beam shaping element (28) within the input beam (32).

4. The apparatus (10) of claim 3, wherein the beam shaping element (28) is rotatable about an axis coinciding with an axis of the input beam (32).

5. The apparatus (10) of claim 1, wherein the beam shaping apparatus comprises one or more actuators configured to implement the movement of the output beam shape.

6. The apparatus (10) of claim 1, wherein the beam shaping element (28) comprises a mask element.

7. The apparatus (10) of claim 6, wherein the mask element defines an X-ray transmissive slit (46).

8. The apparatus (10) of claim 1, wherein the controller (36) is configured to control the movement of the output beam shape such that an area and/or shape of a footprint (114) of the beam formed on a sample (112) held in use by the sample holder (22) changes less, as the tilt angle ($\chi$) varies through a defined range of tilt angles ($\chi$), than it would if the output beam shape remained stationary.

9. The apparatus (10) of claim 1, wherein the controller (36) is configured to control the movement of the output beam shape such that a total amount of flux incident on the sample remains substantially constant across a defined range of tilt angles ($\chi$).

10. The apparatus (10) of claim 1, wherein the controller (36) is configured to control the movement of the output beam shape so as to maintain an incident footprint (114) of the beam within a boundary of a surface of a sample (112) held in use by the sample holder (22).

11. An X-ray analysis device (40) comprising:
a sample holder (22), for holding a sample (112) at variable tilt angle ($\chi$) about a tilt axis (24);
an X-ray source (20);
a beam shaping element (28) adapted to receive an input beam (32) from the X-ray source (20), and generate an output beam (34) having an output beam shape, the sample holder (22) being arranged to receive the output beam, and a controller (36) operatively coupled with the X-ray analysis device (40), and adapted to control movement of the output beam shape dependent upon the variable tilt angle ($\chi$), wherein the output beam shape is an elongate shape, the elongate shape having a length and a width, wherein the length is longer than the width, and the output beam shape defining a longitudinal axis (50) extending along the length and a transverse axis extending along the width, and wherein the movement includes rotation, and wherein the controller (36) is configured to control rotation of the output beam shape so as to maintain the longitudinal axis (50) substantially parallel with a plane defined by a surface of a sample (112) held in use by the sample holder (22).

12. A method of controlling a beam shaping apparatus (10), the apparatus for use in an X-ray analysis device (40),
wherein the X-ray analysis device comprises a sample holder (22), for holding a sample (112) at a variable tilt angle ($\chi$) about a tilt axis (24), and
wherein the beam shaping apparatus comprises a beam shaping element (28) adapted to receive an input beam (32) from an X-ray source (20), and generate an output beam (34) having an output beam shape, and
the method comprising:
obtaining from the X-ray analysis device (40) a signal indicative of the tilt angle ($\chi$) of the sample (112) about the tilt axis (24), and
controlling movement of the output beam shape dependent upon the variable tilt angle ($\chi$), based on the obtained signal,
wherein the output beam shape is an elongate shape, the elongate shape having a length and a width, wherein the length is longer than the width, and the output beam shape defining a longitudinal axis (50) extending along the length and a transverse axis extending along the width, and
wherein the movement includes rotation, and wherein the controller (36) is configured to control rotation of the output beam shape so as to maintain the longitudinal axis (50) substantially parallel with a plane defined by a surface of a sample (112) held in use by the sample holder (22).

13. A computer program product comprising computer program code
wherein,
when the code is executed on at least one physical computing device, and the at least one physical computing device is operatively coupled with the beam shaping apparatus (10) defined in claim 12,
the code causes the at least one physical computing device to carry out the method defined in claim 12.

* * * * *